(No Model.)
G. W. GRAFFLIN, Jr.
NUT LOCK.
No. 490,557. Patented Jan. 24, 1893.
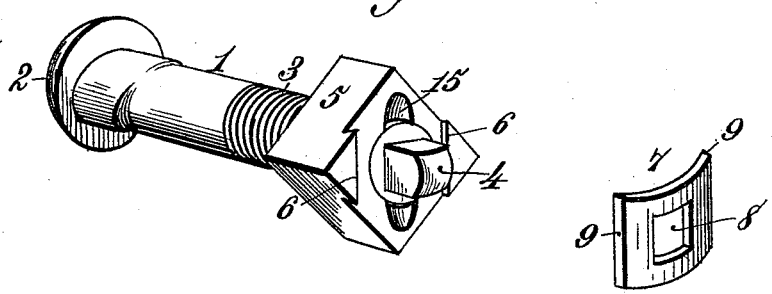
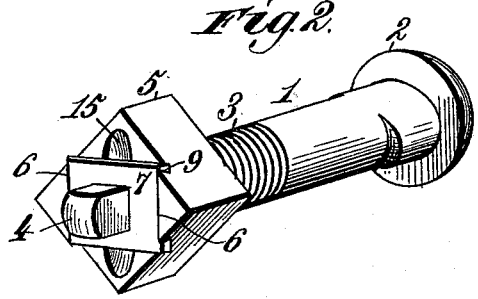 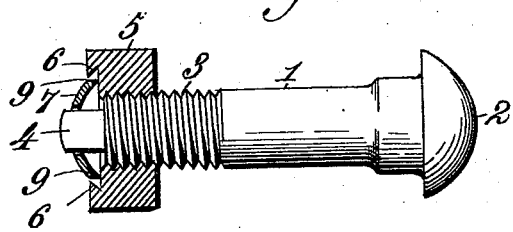
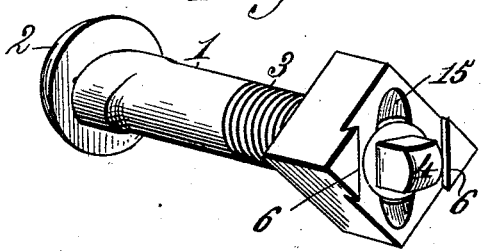 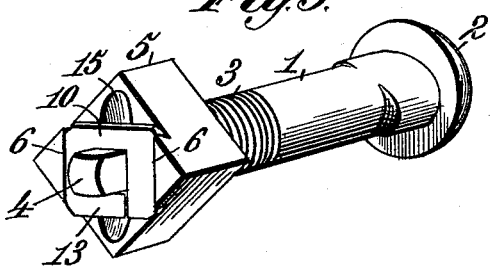
Witnesses.
Robert Garrett
A. H. Norris.
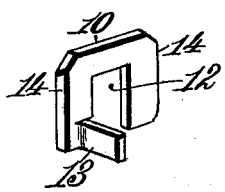
Inventor:
George W. Grafflin Jr
By James L. Norris.
Atty.
THE NORRIS PETERS CO., PHOTO-LITHO., WASHINGTON, D. C.

UNITED STATES PATENT OFFICE.

GEORGE W. GRAFFLIN, JR., OF BALTIMORE, MARYLAND.

NUT-LOCK.

SPECIFICATION forming part of Letters Patent No. 490,557, dated January 24, 1893.

Application filed October 8, 1892. Serial No. 448,233. (No model.)

*To all whom it may concern:*

Be it known that I, GEORGE W. GRAFFLIN, Jr., a citizen of the United States, residing at Baltimore, Maryland, have invented new and useful Improvements in Nut-Locks, of which the following is a specification.

This invention has for its object to provide a new and improved nut lock which is simple in construction, efficient in operation, is susceptible of being economically manufactured by simplified machinery and is useful wherever a screw nut is to be locked in position on a screw bolt or similar screw threaded part.

To accomplish this object the invention consists essentially in the combination of a screw nut having its outer face provided with opposite undercut shoulders, with a bolt having a longitudinal angular extension at one end, and a metallic washer-plate engaging the angular extension of the bolt and having opposite edges interlocked with the under cut shoulders of the nut.

The invention also consists in certain other features of construction and combination or arrangement of parts hereinafter described and claimed, reference being made to the accompanying drawings, in which—

Figure 1, is a perspective view of a bolt, nut and washer-plate constructed according to my invention, the washer-plate being separated from the nut and bolt. Fig. 2, is a similar view showing the washer-plate applied to the bolt and nut. Fig. 3, is a horizontal sectional view showing the washer-plate in position preparatory to engaging it with the nut. Fig. 4, is a perspective view similar to Fig. 1 showing a modification of my invention; and Fig. 5, is a perspective view similar to Fig. 2 showing the washer-plate secured in position according to the modification.

In order to enable those skilled in the art to make and use my invention I will now describe the same in detail, referring to the drawings wherein The numeral 1 indicates a bolt having a suitable head 2, at one end of any desired configuration and a screw threaded portion 3. The extremity of the bolt opposite the head 2 is formed with a longitudinal extension 4 which may be square or of other angular form in cross-section. The screw-nut 5 is adapted to engage the screw threaded portion 3 of the bolt, and the outer face of the nut is formed with a pair of parallel shoulders 6, which are undercut for the purpose of interlocking with opposite edges of a washer-plate 7, as will hereinafter appear. The undercut shoulders 6 are located on the outer face of the nut at points directly opposite each other so that the screw threaded orifice in the nut lies centrally between the undercut shoulders.

The washer-plate is composed of an arched metallic plate having an angular orifice 8 at its center which corresponds in shape with the angular extension 4, so that when the said extension is inserted through the orifice in the washer-plate, it is impossible for the latter to turn independent of the bolt. The opposite edges 9, of the arched metallic washer-plate 7 are beveled to correspond substantially with the undercut edges of the opposite shoulders 6 on the outer face of the screw nut, in such manner that when the nut has been properly adjusted, the arched metallic plate can be forced by a suitable implement into a flat position parallel with the face of the nut so that the opposite beveled edges 9 of the washer-plate are caused to enter into interlocking engagement with the opposite undercut shoulders 6 of the nut. By this means it is impossible for the nut to turn independent of the bolt, because the washer-plate is held against rotation and it in turn holds the nut in a fixed position. It will be observed that the washer plate engages the bolt through the medium of its angular orifice 8, receiving the angular extension 4 of the bolt, and further that the edges of the washer-plate interlock with the undercut shoulders 6, so that it is impossible for the washer-plate to separate in an outward direction from the nut as might occur if the opposite edges 9 of the washer-plate were not interlocked with the face of the nut.

In the modified constructions exhibited by Figs. 4 and 5, the bolt 1 is formed with a suitable head 2, a screw threaded portion 3, and a longitudinal angular extension 4, and the nut 5 is formed on its outer face with parallel undercut shoulders 6 all substantially the same as hereinbefore described with reference to Figs. 1, 2 and 3; but the washer-plate 10 is a flat plate of metal having one side of its angular orifice 12 cut away to form a tongue-piece 13, which, before the washer-plate is applied, stands at right angles to said plate as in Fig. 4. The opposite edges 14 of the washer-plate 10 are beveled in such manner that the plate can be slid into interlocking engagement with the undercut shoulders 6 of the nut, after which the tongue-piece 13 is pressed down so that it lies parallel with the face of the nut as will be understood by reference to Fig. 5. By this means the washer-plate is prevented from sliding from engagement with the bolt and the interlocked engagement of the edges of the washer-plate with the undercut shoulders of the nut effectually prevents the movement of the washer-plate away from the face of the nut. The face of the nut is preferably constructed with recesses 15, to facilitate the passage of a suitable instrument in rear of the washer-plate, for the purpose of forcing the latter out of position whenever it is desired to detach or adjust the nut.

The nut lock is particularly designed for use wherever a screw nut is to be locked in position.

Having thus described my invention what I claim is:—

1. The combination of a screw nut having its outer face provided with opposite undercut shoulders, with a bolt having a longitudinal angular extension at one end, and a metallic washer-plate engaging the angular extension of the bolt and having opposite edges interlocked with the undercut shoulders on the outer face of the nut, substantially as described.

2. The combination of a screw nut having its outer face provided with opposite undercut shoulders, with a bolt having a longitudinal angular extension at one end, and an arched metallic washer-plate engaging the angular extension of the bolt and adapted to be pressed from its arched form into a flattened condition to engage its opposite edges with the undercut shoulders of the nut, substantially as described.

In testimony whereof I have hereunto set my hand in presence of two subscribing witnesses.

GEORGE W. GRAFFLIN, JR.

Witnesses:
WM. COATH,
CHAS. FRANKE.